US009533481B2

(12) United States Patent
Garcia Martin et al.

(10) Patent No.: US 9,533,481 B2
(45) Date of Patent: Jan. 3, 2017

(54) METHOD FOR MANUFACTURING A COMPOSITE MATERIAL PART COMPRISING A WEB AND AT LEAST ONE FLANGE

(71) Applicant: Airbus Operations S.L., Getafe (ES)

(72) Inventors: Diego Garcia Martin, Getafe (ES); Julio Nunez Delgado, Getafe (ES); Lara Barroso Fernandez, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 14/864,281

(22) Filed: Sep. 24, 2015

(65) Prior Publication Data
US 2016/0089866 A1 Mar. 31, 2016

(30) Foreign Application Priority Data

Sep. 26, 2014 (EP) .................................. 14186567

(51) Int. Cl.
*B32B 37/10* (2006.01)
*B29C 70/34* (2006.01)
*B29D 99/00* (2010.01)
*B29C 70/22* (2006.01)
*B32B 37/14* (2006.01)
*B32B 38/18* (2006.01)

(52) U.S. Cl.
CPC ............. *B32B 37/10* (2013.01); *B29C 70/222* (2013.01); *B29C 70/34* (2013.01); *B29D 99/0003* (2013.01); *B32B 37/14* (2013.01); *B32B 38/1825* (2013.01); *B32B 2309/16* (2013.01)

(58) Field of Classification Search
CPC ...... B32B 37/10; B32B 2309/16; B32B 37/14; B32B 38/1825
See application file for complete search history.

(56) References Cited

U.S. PATENT DOCUMENTS

| 8,454,876 B2 | 6/2013 | Graeber |
| 2008/0048359 A1 | 2/2008 | Krogager et al. |
| 2009/0057948 A1 | 3/2009 | Krogager et al. |

(Continued)

FOREIGN PATENT DOCUMENTS

| EP | 1775106 | 4/2007 |
| EP | 1932652 | 6/2008 |

(Continued)

OTHER PUBLICATIONS

European Search Report, Mar. 13, 2015.

*Primary Examiner* — Jacob T Minskey
*Assistant Examiner* — Vishal I. Patel
(74) *Attorney, Agent, or Firm* — Greer, Burns & Crain Ltd.

(57) ABSTRACT

A method for manufacturing a composite material part comprising a web and at least one flange. In a laying up stage, a plurality of plies of different orientations, including 0° oriented plies, are laid up to obtain a flat laminate with edges comprising an outer contour and an inner contour, the flat laminate also comprising at least one section with a radius of curvature of less than 10 m. A forming stage comprises forming a fold along a folding line on the flat laminate to create a flange forming an angle with the web, and applying a stress tension to the 0° oriented plies located at least partially between the folding line and the outer contour of the flat laminate, in the at least one section, to avoid the appearance of wrinkles.

11 Claims, 5 Drawing Sheets

(56) References Cited

U.S. PATENT DOCUMENTS

| | | |
|---|---|---|
| 2010/0148005 A1 | 6/2010 | Weidmann et al. |
| 2010/0285265 A1* | 11/2010 | Shinoda ................. B29B 11/16 428/80 |
| 2011/0250381 A1 | 10/2011 | Nyman et al. |
| 2014/0147619 A1 | 5/2014 | Grankaell et al. |

FOREIGN PATENT DOCUMENTS

| | | |
|---|---|---|
| EP | 2233625 | 9/2010 |
| WO | 2010056164 | 5/2010 |
| WO | 2012099512 | 7/2012 |

* cited by examiner

METHOD FOR MANUFACTURING A COMPOSITE MATERIAL PART COMPRISING A WEB AND AT LEAST ONE FLANGE

CROSS-REFERENCES TO RELATED APPLICATIONS

This application claims the benefit of the European patent application No. 14186567.5 filed on Sep. 26, 2015, the entire disclosures of which are incorporated herein by way of reference.

FIELD OF THE INVENTION

This invention refers to a method for manufacturing a composite material part comprising a web and at least one flange, and more in particular to a method for manufacturing a composite material part comprising a web and at least one flange used in the aeronautical industry, such as fuselage frames, curved spars for horizontal tail planes (HTP), wing spars or wing stringers.

BACKGROUND OF THE INVENTION

At the moment structural integrity and high production rate are fundamental characteristics in the aeronautical industry, where competitiveness between airlines is very tough.

Years ago aircraft were mostly or totally built up with metallic components, providing a good performance in terms of mechanical behavior but, as a drawback, they were penalized in terms of weight.

As the aeronautical industry requires structures that, on the one hand, withstand the loads to which they are subjected, meeting high requirements of strength and stiffness, and on the other hand, are as light as possible, the use of composite materials (as carbon fiber reinforced polymers, CFRP) in primary structures is more and more extended, because with appropriate application of these composite materials it is possible to achieve an important weight saving relative to a design in metallic material.

Carbon fiber reinforced composite materials are difficult to adapt to curved surfaces, the appearance of wrinkles during their forming process being very common. The process of forming from a flat laminate to create a "C" shape is achievable as far as no significant curvature is required. The conventional process usually comprises laying up prepreg plies to form a flat laminate, a forming process to create the "C" shape, and finally a curing process. In this process, if there is a curvature in the piece, the appearance of wrinkles is very common.

Nowadays, the methods used to form the "C" profile of a spar are hot-forming (for simple "C" profiles), press-forming (for higher thicknesses and small curvature) and direct deposition with Advanced Fiber Placement (AFP) 3D technology (when the curvatures are very high; however, this technology has some restrictions).

These methods allow the manufacturing of classical C-shaped spars, but when the curvature is higher, the appearance of wrinkles does not allow the validation of the process.

EP 1775106 A1, referred to a "manufacturing method for a curved spar and other curved objects," discloses a method for producing an object of composite material comprising the steps of:

placing one or several prepregs on a plane surface, forming a fiber stack;

lifting over the fiber stack to a molding tool,
downforming the fiber stack,
curing the downformed fiber stack, and
orienting the fiber directions so that all fibers, when the fiber stack is lifted over to the molding tool, will cross an edge of the molding tool only once.

In this document the orienting of the fiber directions of the prepregs in the fibers stack is such that none of the fiber directions of the prepregs occur parallel with a curve of the molding tool. The downforming may then be carried out in a simpler manner.

WO 2010/056164 A1, referred to a "method of forming a composite article," discloses a method in which it is possible to hot drape form an article on a tool without creating wrinkles in the article. In this method a certain stacking sequence is used for avoiding wrinkling when forming an article by hot drape forming. Plies having fibers in the longitudinal direction of the tool, plies having fibers in the orthogonal direction of the tool and fibers having a diagonal direction of the tool are arranged in a specific order in the stack to avoid wrinkles. However, in some cases there might still be some problems during the forming in which wrinkles are formed in the article.

WO 2012/099512 A1, referred to "a composite article and a method of forming a composite article," intends to solve the problem of the formation of wrinkles in the stack of plies during the formation process of the composite article. This document relates to a composite article, wherein the article has a longitudinal direction and a transversal direction, the article comprising a stack of plies wherein one ply is a bottom ply and one ply is a top ply, most of or all of the plies comprising fibers, and the article comprising a plurality of plies having fibers substantially in the orthogonal direction to the longitudinal direction of the article and a plurality of plies having fibers substantially in the same direction as the longitudinal direction of the article, wherein at least one of the ply/plies having fibers substantially in the orthogonal direction to the longitudinal direction of the article comprises fibers that are stiffer than the fibers in the other plies which have less stiff fibers.

SUMMARY OF THE INVENTION

An object of the present invention is to provide a method for manufacturing a composite material part comprising a web and at least one flange that avoids the appearance of wrinkles.

The invention provides a method for manufacturing a composite material part comprising a web and at least one flange comprising the following stages:

a laying up stage, wherein a plurality of plies of different orientations, including 0° oriented plies, are laid up to obtain a flat laminate with edges comprising an outer contour and an inner contour, the flat laminate also comprising at least one section with a radius of curvature of less than 10 m, and a forming stage which comprises forming a fold along a folding line on the flat laminate to create a flange forming an angle with the web, wherein the forming stage additionally comprises applying a stress tension to the 0° oriented plies located at least partially between the folding line and the outer contour of the flat laminate in the at least one section with a radius of curvature of less than 10 m to avoid the appearance of wrinkles.

The stress tension introduced on the plies at 0° during the forming process of the part avoids the appearance of wrinkles that otherwise would appear as a consequence of the formation of the fold along a curved contour, with the consequent compression in the plies at 0°.

Other characteristics and advantages of the present invention will be clear from the following detailed description of several embodiments illustrative of its object in relation to the attached figures.

DETAILED DESCRIPTION OF THE PREFERRED EMBODIMENTS

Figure 1:
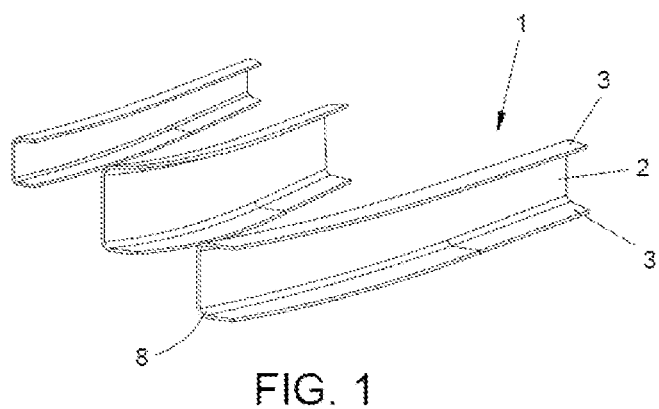
FIG. 1 shows several spars having sections with different curvatures.

FIG. 1 shows different spars with curvature, adapted to different geometries. In FIG. 1 it can be seen that a composite material part 1 (for instance, a spar) comprises a web 2 and two flanges 3.

In this document it will be considered that a curvature is high when its radius is less than 10 m.

Figure 2:
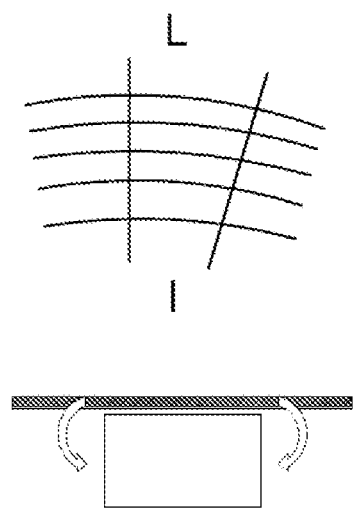
FIG. 2 shows a plan view and a front view of a laminate of composite material before creating a C-shaped piece with a fold along a curved contour using a conventional process.

FIG. 2 shows a plan view and a front view of a flat laminate of composite material before creating a C-shaped part with curvature using a conventional process. The external part L of the laminate (i.e., the part which is farther from the center of curvature) is longer than the internal part I of the laminate (i.e., the part which is closer to the center of curvature). As previously indicated, when forming the C-shape, wrinkles tend to appear in the area between the folding line and the longer curved side.

Figure 3:
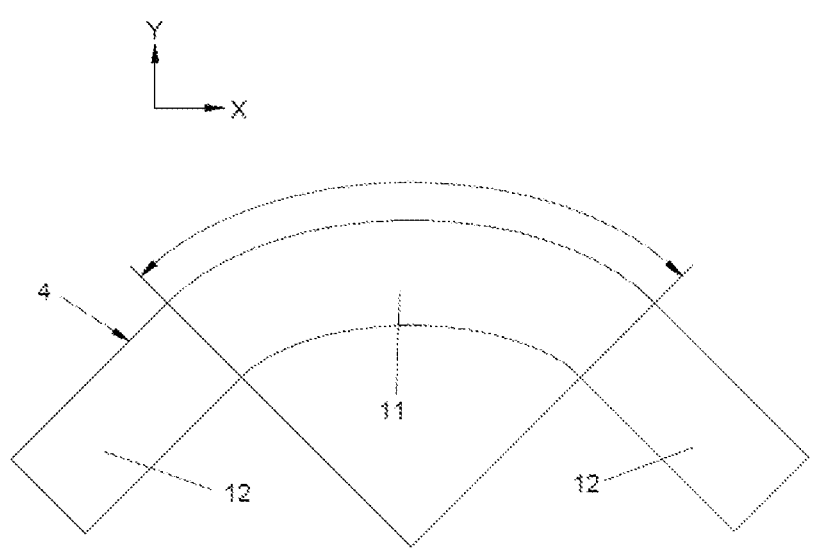
FIG. 3 shows a plan view of a flat laminate with a section having a high curvature.

FIG. 3 shows a plan view of a flat laminate 4 with a central section 11 having a high curvature (i.e., with a radius of curvature of less than 10 m). The side sections 12 do not have a high curvature, so they can be manufactured according to usual methods, although they can also be manufactured according to the method of the invention.

Figure 4A:
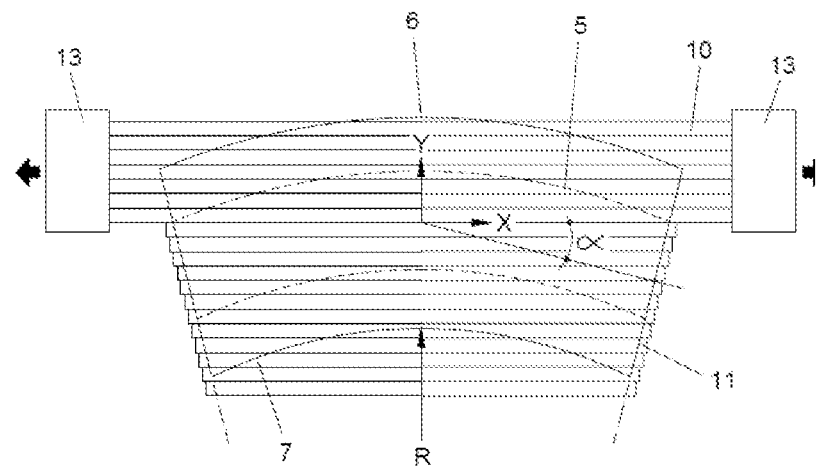
FIG. 4a shows a plan view of the section having a high curvature of the flat laminate before being transformed into a part comprising a web and at least one flange.

FIG. 4a shows a plan view of the section 11 having a high curvature of the flat laminate 4 before being transformed into a part comprising a web 2 and at least one flange 3. In this figure the X axis indicates the 0° direction of the plies 9 to be laid up to obtain the flat laminate 4.

As it can be seen in FIG. 4a, the flat laminate 4 has edges comprising an outer contour 6 and an inner contour 7, the outer contour 6 being longer than the inner contour 7. In the section 11 having a high curvature, the outer contour 6 is the contour which is farther from the center of curvature, and the inner contour 7 is the contour which is closer to the center of curvature. FIG. 4a also shows a folding line 5 on the flat laminate, the folding line 5 being curved in the section 11 having a high curvature.

Figure 4B:
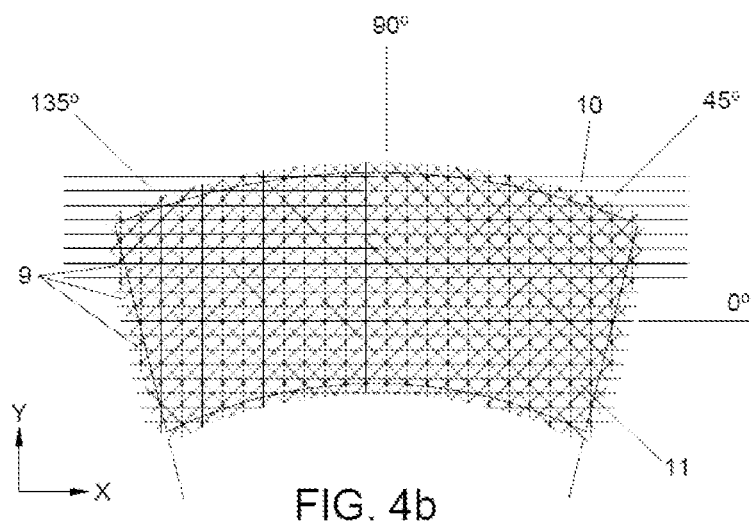
FIG. 4b shows a plan view of the section having a high curvature of the flat laminate showing the plies oriented at different directions.

As it can be seen in FIG. 4b, the plies 9 to be laid up to obtain the flat laminate 4 may be oriented at several orientations besides the orientation at 0°. For instance, they may be oriented at 0°, 90°, ±45° and ±30°.

The plies located at least partially between the folding line 5 and the outer contour 6 of the flat laminate 4 in the section 11 with a radius of curvature of less than 10 m may extend laterally on both sides beyond the edges of the flat laminate 4, as it can be seen in FIG. 4a.

In FIG. 4a the ends of the extended plies 10 at 0° are held by two holding devices 13, one at each longitudinal end.

The method for manufacturing a composite material part 1 comprising a web 2 and at least one flange 3 of the invention comprises the following stages:

a laying up stage, wherein a plurality of plies 9 of different orientations, including 0° oriented plies, are laid up to obtain a flat laminate 4 with edges comprising an outer contour 6 and an inner contour 7, the flat laminate 4 also comprising at least one section 11 with a radius of curvature of less than 10 m, and a forming stage which comprises forming a fold 8 along a folding line 5 on the flat laminate 4 to create a flange 3 forming an angle with the web 2.

The forming stage additionally comprises applying a stress tension to the 0° oriented plies located at least partially between the folding line 5 and the outer contour 6 of the flat laminate 4 in the at least one section 11 with a radius of curvature of less than 10 m to avoid the appearance of wrinkles.

In an embodiment of the invention the flange 3 forms an angle between 80° and 100° with the web 2.

In an embodiment of the invention, the stress tension is applied to the mentioned 0° oriented plies during all the forming stage.

In another embodiment of the invention, the 0° oriented plies located at least partially between the folding line 5 and the outer contour 6 of the flat laminate 4 in the section 11 with a radius of curvature of less than 10 m extend laterally on both sides beyond the edges of the flat laminate 4. The extended plies 10 at 0° may be stretched following the direction of the plies at 0° by holding devices 13 that hold the ends of the extended plies 10 at 0°, and that release them once the forming stage is completed.

Any suitable holding devices 13, such as clamps, may be used.

The holding devices 13 at one end may be parallel to the holding devices 13 at the opposite end, such that the extended plies 10 at 0° have the same length. According to another embodiment, the holding devices 13 at one end are not parallel to the holding devices 13 at the opposite end, such that the extended plies 10 at 0° have different lengths, which allows saving material.

Figure 5:
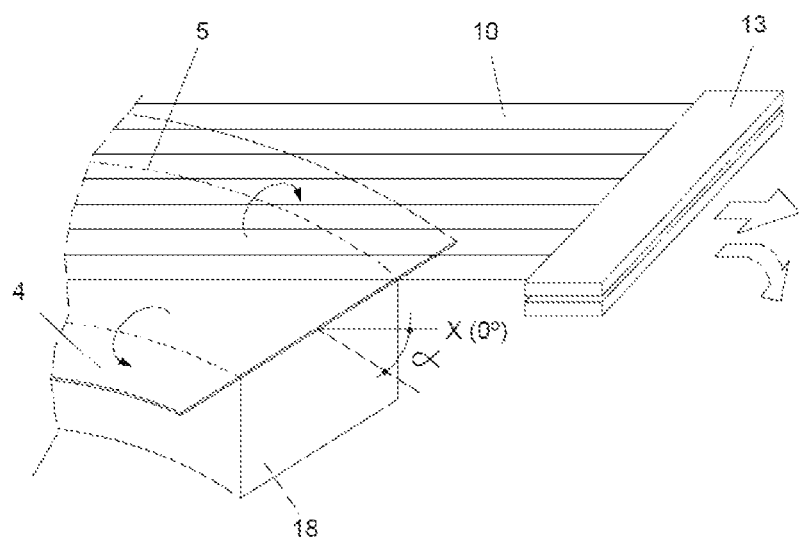
FIG. 5 shows a schematic view of the hot-forming process of the invention with a hot-forming membrane (not shown).

FIG. 5 corresponds to a hotforming method according to another embodiment of the invention. In this method, which also comprises the basic steps of the general method, in the forming stage the flat laminate 4 is placed on a tool 18 and a membrane (not shown) is placed covering both the flat laminate 4 and the tool 18, and the following steps are additionally performed:

the flat laminate 4 is bent on the tool 18 by hotforming, gradually obtaining the desired shape, and at the same time that the flat laminate 4 is being bent, the holding devices 13 rotate about an axis in order to keep the extended plies 10 at 0° aligned with the portion of the flat laminate 4 that is being bent.

It is to be taken into account that FIG. 5 only shows a half of the assembly, the other half being symmetrical.

Figure 6:
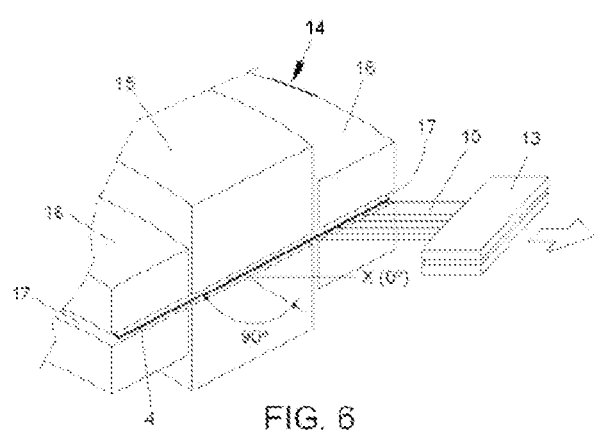
FIG. 6 shows a schematic view of the press-forming process of the invention with press forming tools and holding devices in an initial position.
Figure 7:
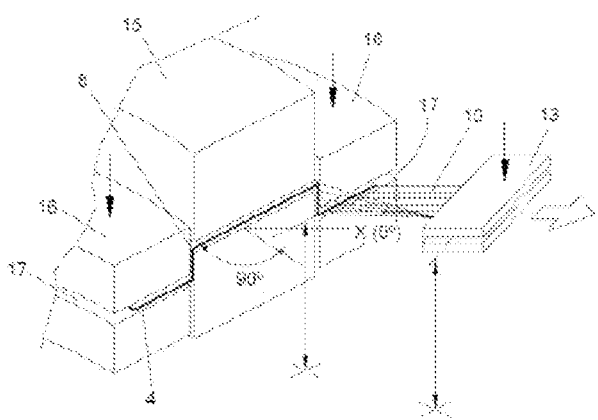
FIG. 7 shows a schematic view of the press-forming process of the invention with press forming tools and holding devices in an intermediate position.

FIGS. 6 and 7 correspond to a pressforming method according to another embodiment of the invention. In this method, which also comprises the basic steps of the general method, in the forming stage the flat laminate 4 is placed on a press machine 14 comprising a fixed central module 15 and at least one movable side module 16. Each module 15, 16 comprises two parts separated by an intermediate slot 17. After the holding devices (13) stretch the extended plies 10 at 0°, introducing a pretension stress on them, the following steps are additionally performed:

the at least one movable side module 16 begins to move in a perpendicular direction with respect to the flat laminate 4, applying pressure on the flat laminate 4 to obtain the desired shape by press-forming, the holding devices 13 move at the same time in the same perpendicular direction as the at least one side module 16 with respect to the flat laminate 4, such that the height of the slot 17 of the at least one side module 16 is the same as the height of the holding devices 13 during the press-forming process, as it can be seen in FIG. 7.

FIG. 6 corresponds to the initial position of the press machine 14, the holding devices 13 and the flat laminate 4, and FIG. 7 corresponds to an intermediate position, where the fold 8 is being formed. A C-shaped part (for instance, a spar, with a curved web and two flanges shorter than the web, as in FIG. 1) may be obtained through the process shown in FIGS. 6 and 7.

It is to be taken into account that FIGS. 6 and 7 only show a half of the assembly, the other half being symmetrical.

According to another embodiment of the invention, after the forming stage is completed the extended plies 10 at 0° are cut and the part 1 is machined to remove excess material, thus obtaining the final geometry of the part 1.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a composite material part comprising a web and at least one flange comprising the following stages:

a laying up stage which comprises a step of laying up a plurality of plies of different orientations, including 0° oriented plies, to obtain a flat laminate with edges comprising an outer contour and an inner contour, the flat laminate also comprising at least one section with a radius of curvature of less than 10 m, and a forming stage which comprises forming a fold along a folding line on the flat laminate to create a flange forming an angle with the web, the forming stage additionally comprising a step of applying a stress tension to the 0° oriented plies located at least partially between the folding line and the outer contour of the flat laminate in the at least one section with a radius of curvature of less than 10 m to avoid the appearance of wrinkles, wherein the 0° oriented plies located at least partially between the folding line and the outer contour of the flat laminate in the at least one section with a radius of curvature of less than 10 m extend laterally on both sides beyond the edges of the flat laminate.

2. The method for manufacturing a composite material part comprising a web and at least one flange according to claim 1, wherein the stress tension is applied to the 0° oriented plies during the entire forming stage.

3. The method for manufacturing a composite material part comprising a web and at least one flange according to claim 1, including a step of stretching the extended plies at 0° following the direction of the plies at 0° by holding devices that hold the ends of the extended plies at 0°, and that release them once the forming stage is completed.

4. The method for manufacturing a composite material part comprising a web and at least one flange according to claim 3, wherein the holding devices are clamps.

5. The method for manufacturing a composite material part comprising a web and at least one flange according to claim 3, wherein the holding devices at one end are parallel to the holding devices at the opposite end, such that the extended plies at 0° have the same length.

6. The method for manufacturing a composite material part comprising a web and at least one flange according to claim 3, wherein the holding devices at one end are not parallel to the holding devices at the opposite end, such that the extended plies at 0° have different lengths.

7. The method for manufacturing a composite material part comprising a web and at least one flange according to claim 1, wherein the plies are oriented at several orientations in addition to the orientation at 0°.

8. A method for manufacturing a composite material part comprising a web and at least one flange comprising the following stages:

a laying up stage which comprises a step of laying up a plurality of plies of different orientations, including 0° oriented plies, to obtain a flat laminate with edges comprising an outer contour and an inner contour, the flat laminate also comprising at least one section with a radius of curvature of less than 10 m, and a forming stage which comprises forming a fold along a folding line on the flat laminate to create a flange forming an angle with the web, the forming stage additionally comprising a step of applying a stress tension to the 0° oriented plies located at least partially between the folding line and the outer contour of the flat laminate in the at least one section with a radius of curvature of less than 10 m to avoid the appearance of wrinkles, wherein the 0° oriented plies located at least partially between the folding line and the outer contour of the flat laminate in the at least one section with a radius of curvature of less than 10 m extend laterally on both sides beyond the edges of the flat laminate, wherein the ends of the extended plies at 0° are held by holding devices, wherein in the forming stage the flat laminate is placed on a tool and a membrane is placed covering both the flat laminate and the tool, and the following steps are additionally performed:

bending the flat laminate on the tool by hotforming, gradually obtaining the desired shape, and at the same time that the flat laminate is being bent, rotating the holding devices about an axis in order to keep the extended plies at 0° aligned with the portion of the flat laminate that is being bent.

9. A method for manufacturing a composite material part comprising a web and at least one flange comprising the following stages:

a laying up stage which comprises a step of laying up a plurality of plies of different orientations, including 0° oriented plies, to obtain a flat laminate with edges comprising an outer contour and an inner contour, the flat laminate also comprising at least one section with a radius of curvature of less than 10 m, and a forming stage which comprises forming a fold along a folding line on the flat laminate to create a flange forming an angle with the web, wherein the 0° oriented plies located at least partially between the folding line and the outer contour of the flat laminate in the at least one section with a radius of curvature of less than 10 m extend laterally on both sides beyond the edges of the flat laminate, wherein the ends of the extended plies at 0° are held by holding devices, the forming stage additionally comprising a step of applying a stress tension to the 0° oriented plies located at least partially between the folding line and the outer contour of the flat laminate in the at least one section with a radius of curvature of less than 10 m to avoid the appearance of wrinkles, including a step of cutting the extended plies at 0° after the forming stage is completed and machining the part to remove excess material, thus obtaining a final geometry of the part.

10. The method for manufacturing a composite material part comprising a web and at least one flange according to claim 9, wherein, the forming stage includes a step of placing the flat laminate on a press machine comprising a fixed central module and at least one movable side module, each module comprising two parts separated by an intermediate slot, and such that after the holding devices stretch the extended plies at 0°, introducing a pretension stress on them, the following steps are additionally performed:

applying pressure on the flat laminate to obtain the desired shape by press-forming, as the at least one movable side module begins to move in a perpendicular direction with respect to the flat laminate, moving the holding devices at the same time, in the same perpendicular direction, as the at least one side module with respect to the flat laminate, such that the height of the slot of the at least one side module is the same as the height of the holding devices during the press-forming process.

11. The method for manufacturing a composite material part comprising a web and at least one flange according to claim 1, wherein the flange forms an angle between 80° and 100° with the web.

* * * * *